United States Patent [19]

Barbulescu

[11] Patent Number: 4,896,012
[45] Date of Patent: Jan. 23, 1990

[54] LOW FRICTION WIRE GUIDE FOR ELECTRICAL DISCHARGE MACHINE

[75] Inventor: George Barbulescu, Ann Arbor, Mich.

[73] Assignee: Raycon Corporation, Ann Arbor, Mich.

[21] Appl. No.: 331,867

[22] Filed: Apr. 3, 1989

[51] Int. Cl.⁴ .......................... B23H 7/10; B23H 9/14
[52] U.S. Cl. ................................................. 219/69.12
[58] Field of Search ................. 219/69.15, 69.12, 69.2; 204/206, 224 M

[56] References Cited

U.S. PATENT DOCUMENTS 4,782,203 11/1988 Check et al. ..................... 219/69.15
4,791,264 12/1988 Walser ............................... 219/69.12

FOREIGN PATENT DOCUMENTS 62-39126 2/1987 Japan ................................. 219/69.2

Primary Examiner—A. D. Pellinen
Assistant Examiner—Geoffrey Evans
Attorney, Agent, or Firm—John C. Evans

[57] ABSTRACT

A wire guide for a servo driven wire electrode in an electrical discharge machine (EDM) has inserts defining a precision guide slot for the electrode. The inserts are coated with a low friction coating to smooth the servo drive of the wire electrode through the wire guide so as to improve spark gap erosion produced between a tip portion of the electrode and a workpiece.

8 Claims, 2 Drawing Sheets

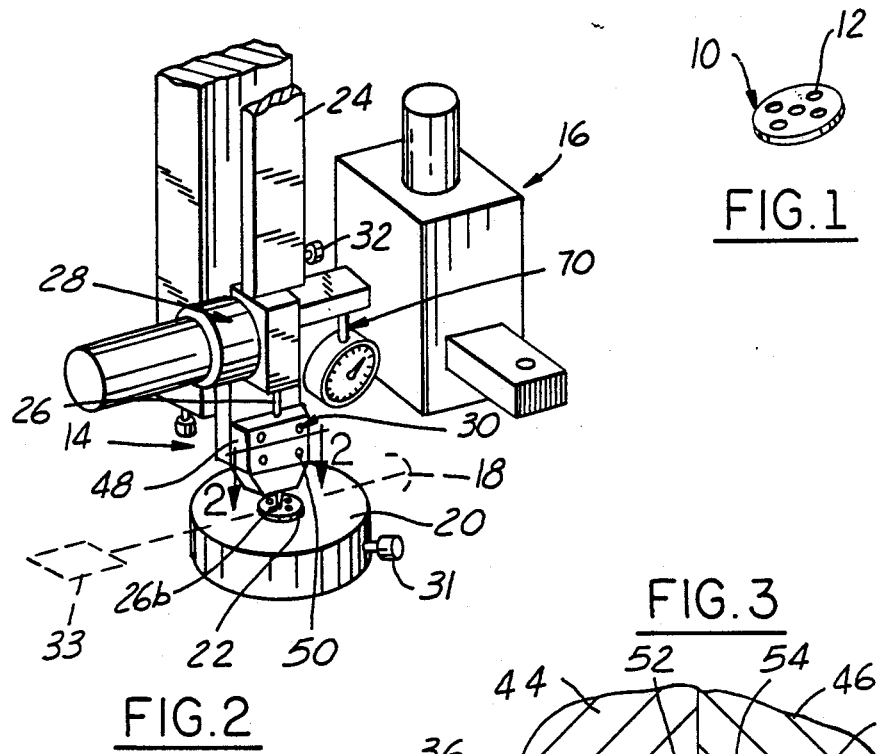
FIG.1
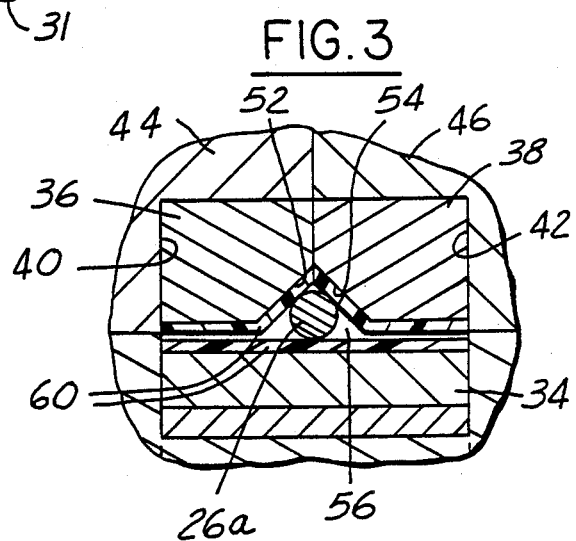
FIG.2
FIG.3

LOW FRICTION WIRE GUIDE FOR ELECTRICAL DISCHARGE MACHINE

FIELD OF THE INVENTION

This invention relates to electric discharge machines (EDM); more particularly, it relates to a wire guide for use in apparatus for machining multiple parts or workpieces with substantially uniform accuracy.

BACKGROUND OF THE INVENTION

In many applications, electric discharge machining is used for the mass production of parts which must be machined to close tolerances. There are several factors which affect the repeatability of accuracy of machining by the EDM process including the process parameters of electrode size, spark energy, spark current, gap length, gap voltage and the wire guide used to direct the electrode to a workpiece. For example, when the EDM process is used to machine a small hole through a thin plate, the small dimensions of the wire electrode require a support system which is sufficiently accurate to support the electrode in all directions while providing smooth servo drive of the electrode through the wire guide.

One problem is that prior wire guides for directing electrodes with respect to a workpiece can frictionally engage the electrode in a manner to increase the observed vibration amplitude in the electrode tip during electric discharge machining of a hole in a workpiece.

Accordingly, there is a need to provide an improved low friction wire guide which will smooth the servo drive of an electrode wire as its tip is driven with respect to a workpiece to remove metal therefrom.

A general object of this invention is to provide an improved wire guide having low friction wire guide surfaces for smoothing wire electrode travel during electric discharge machining so as to obtain a high degree of repeatable accuracy in the machining of parts.

SUMMARY OF THE INVENTION

In accordance with this invention, apparatus is provided for electric discharge machining of workpieces on a mass production basis with greater workpiece feature formation repeatability than achieved heretofore. This is accomplished by providing means for reducing the surface friction between the electrode and guide slot inserts whereby the servo drive of the electrode is smoothed as it passes through the electrode support system thereby to achieve uniform hole dimensions and shape in the machined part.

Further, according to the invention, a wire guide is provided for use in electrical discharge machines which includes means which hold a wire electrode position to produce workpiece features having a specified size within predetermined tolerances. Specifically, guide surfaces forming a precision slot for guiding a wire electrode are coated with polytetrafluoroethylene to reduce sliding friction on the wire electrode so that the effectiveness of the electrical discharge is maintained to cause workpieces to be machined so that the size and shape of the feature is within predetermined tolerances.

A further feature of the present invention is to smooth the servo drive of a wire electrode having a tip thereon concentrically guided within a wire guide.

Yet another feature of the present invention is to smooth such servo drive by the provision of a wire guide for contacting the outer surface of an electrode so as to guide the tip of the electrode with respect to the workpiece as it is driven into spark gap relationship therewith; and by the further provision of means for reducing sliding friction between the wire guide and the outer surface of the electrode to reduce the amplitude of the operational vibration modes of an electrode tip with respect to a workpiece during a spark gap erosion machining operation between the electrode tip and the workpiece.

Still another feature of the present invention is to smooth servo dive of such an electrode tip by the use of fluoroplastic coatings on the guide surfaces of the wire guide operative to reduce sliding friction between the wire electrode and the wire guide as the servo drives the wire electrode tip therethrough during spark erosion of material from the workpiece.

Another feature of the present invention is to provide a wire guide of any of the preceding objects or features wherein the friction control is provided by a layer of plastic material having a coefficient of sliding friction with respect to the material of said wire electrode less than 0.2 for smoothing the servo-drive of said wire electrode.

Still another object is to form the layer of plastic material from a fluoroplastic material.

Yet another object of the invention is to form the layer of plastic material from a fluoroplastic material including polytetrafluoroethylene.

BRIEF DESCRIPTION OF THE DRAWINGS

Further objects and advantages of the invention will appear from the following description taken together with the accompanying drawings in which:

FIG. 1 is a perspective view of a workpiece formed by use of the present invention;

FIG. 2 is a fragmentary, diagrammatic view of an electrical discharge machine including the present invention;

FIG. 3 is a sectional view taken along line 2—2 of FIG. 1 looking in the direction of the arrows;

BEST MODE FOR CARRYING OUT THE INVENTION

Figure 4:
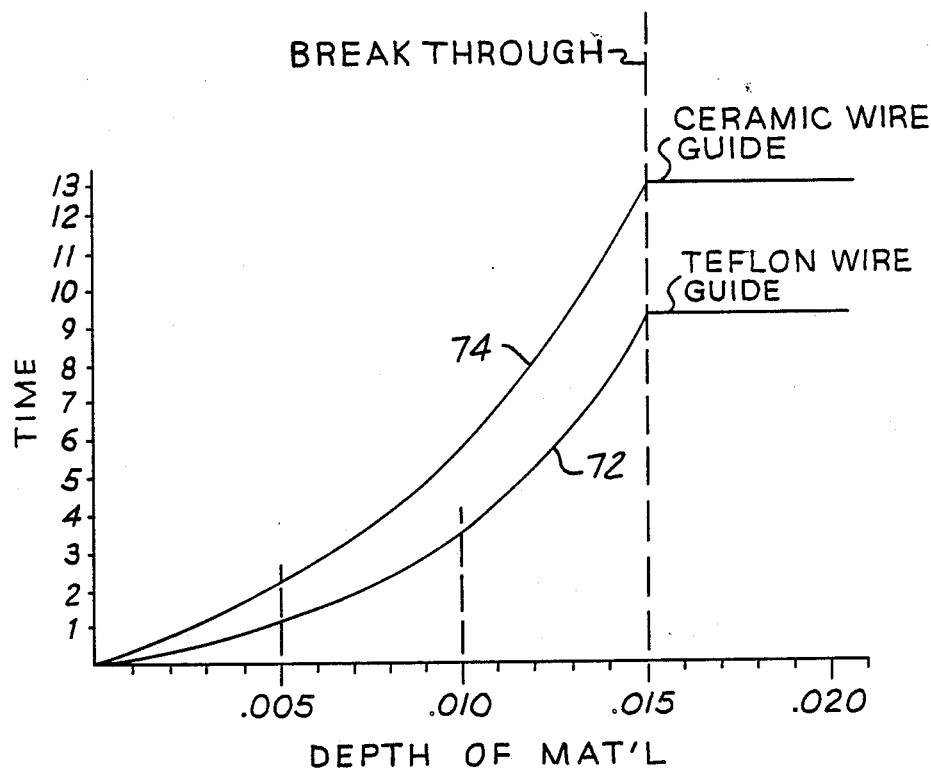
FIG. 4 is a graph showing comparative differences in machining time.

Referring now to the drawings, there is shown an illustrative embodiment of the invention in an apparatus for electric discharge machining using an adaptive control system which adjusts a selected EDM parameter in response to a feedback signal representing workpiece measurement data. The adjustable EDM parameter is spark energy. A hole or set of holes is the workpiece feature to be machined to a specified size, as measured by its fluid flow capacity. It will be appreciated as the description proceeds that the invention may be embodied in many different forms and utilized for many different applications.

In the illustrative embodiment of the invention to be described, an electric discharge machining method and apparatus is utilized for machining a set of small holes in a thin wall. In particular, the example workpiece is an orifice plate for a fuel injection nozzle for use in an automotive engine. Such workpieces or parts must be manufactured in high volume using mass production techniques and must be held to very close dimensional tolerances. As shown in FIG. 1, the workpiece or part comprises a circular plate 10 with a set of six small holes 12 in a circular array surrounding the center of the plate 10. In the example workpiece, each of the holes has a specified diameter of size thousandths of an inch with a tolerance of plus or minus one ten thousandth of an inch. The set of holes of such size, taken collectively, has a certain fluid flow capacity. Measured flow capacity is used as an index of size.

The electric discharge machine embodying the invention is shown diagrammatically in FIG. 2. It has a machining station 14 and a test station 16 further discussed in commonly assigned U.S. Pat. No. 4,725,705, for Method and Apparatus for Electric Discharge Machining, the specification of which is incorporated herein by reference.

The machining station 14 comprises a workpiece holder 20 which has a nest 22 thereon adapted to receive the workpiece 10. The holder 20 is mounted on an index table or turret (not shown) which is adapted to rotate the holder 20 to position the workpiece 10 in six different angular positions, one for each hole to be machined. The head of the electric discharge machine comprises a carriage 24 which supports and feeds a wire electrode 26 for machining the holes in the workpiece at the work station on the holder 20. The wire electrode 26 passes through a refeed mechanism 28 and a wire guide 30 to the workpiece. The refeed mechanism 28 is adapted to advance the electrode wire, which is supplied from a spool (not shown), relative to the carriage 24 upon retraction of the carriage after each machining operation. After each machining operation to form one of the holes 12, the downward limit of the carriage 24 is sensed by a limit switch 32 which causes the holder 20 to be indexed to place the next hole location at the work station on the holder. When the holder 20 is indexed to the position for machining the last hole in the workpiece, a limit switch 31 enables the actuation of a transfer drive 33 of a transfer mechanism 18. Upon completion of machining of the last hole in the workpiece, the limit switch 31 causes energization of the drive 33 and the transfer mechanism 18 is actuated to transfer the workpiece 10 from the machining station 14 to a test station (not shown) whose structure and operation are more specifically set forth in the referenced U.S. Pat. No. 4,725,705.

The workpiece 10 is electrically conductive so that when the proper gap is established between the wire electrode 26 and the workpiece 10 a spark is established and maintained during the electrical discharge machining process. A suitable process is fully described in the '705 patent, it being understood, however, that the present invention is suitable for use with a wide range of EDM machines.

Referring now to FIG. 3, the wire guide 30 of the present invention has an insert 34 associated with two other ceramic inserts 36, 38 carried in side grooves 40, 42 in machined wire guide holders 44, 46. The inserts 36, 38 can be bonded in place by suitable adhesive. The holders 44, 46 are secured to a wire guide housing 48 by screws 50 so as to locate the inserts 36, 38 to align edge chamfers 52, 54 thereon to form a V-slot 56 for guiding an extension 26a on the electrode wire 26 through the wire guide 30.

In accordance with the present invention, the surfaces of the inserts which engage the wire segment 28a are coated with a low friction material such as a fluoroplastic material which will reduce the sliding friction between the wire electrode 28 and the wire guide 30 as the segment 28a is directed through the wire guide 30 during the spark erosion machining operation. In the past the inserts have been formed from steel or ceramic material with untreated guide surfaces. Such untreated guide surfaces tend to resist the movement of the segment 28a. The resistance to movement increases the time required for the servo advance of the tip 26b through the workpiece. Also, such resistance to movement tends to increase the amplitude of vibration of the wire guide 30 during the machining operation through the workpiece and especially at initial entry of the wire tip 28b, into spark gap positioning with the entrance to an EDM'd hole and at breakout from the EDM'd hole.

More specifically, the insert edge chamfers 52, 54 and the surface 58 of the insert 34 which form the V-slot 56 are coated with a layer 60 of polytetrafluoroethylene of a thickness in the order of 0.02 or less which reduces the coefficient of sliding friction between the guide 30 and the wire electrode 26 passing therethrough during the EDM operation.

While polytetrafluoroethylene (TFE) is the preferred fluoroplastic coating other materials for reducing sliding friction can include modified PE-TFE or PFA fluoroplastic material and polychlorotrifluoroethylene (PE) and other materials with a coefficient of sliding friction of 0.2.

In one working embodiment the wire electrode 28 had a diameter of 0.0057 inch and was 304 stainless steel. The dielectric used in the hole formation was water. The TFE coating produced a smooth servo drive which reduced machining time and also reduced the amplitude of holder vibration as indicated by a gage 70 attached to the machine to read the position of the servo carriage 24.

As shown in FIG. 4, the time for traveling through the workpiece for a wire guide coated with TFE (shown by curve 72) was approximately 25% less than the time to servo drive an electrode wire 26 through the workpiece when gripped by a ceramic wire guide without the TFE coating (shown by curve 74).

Figure 5:
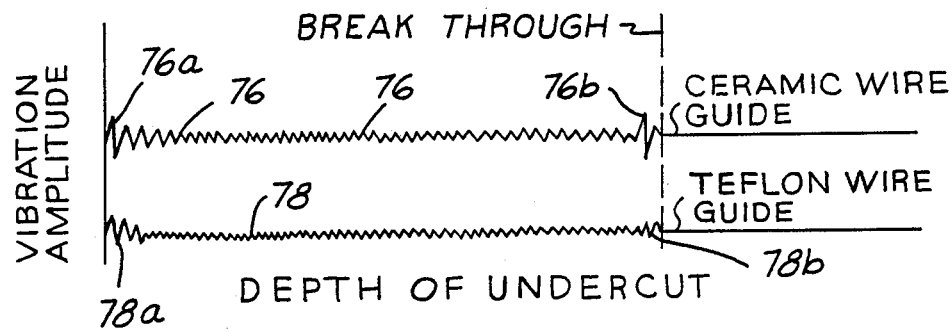
FIG. 5 is a graph showing reductions in the amplitude of vibrations of electrodes with and without the present invention.

As shown in FIG. 5, the amplitude of vibration of a ceramic wire guide (curve 76) is two to three times the amplitude of the vibration of a TFE coated wire guide of the present invention (curve 78). The curve 78 has entrance vibrations 78a and breakthrough vibrations 78b in the order of the vibrations 76c in the ceramic unit between entrance vibrations 76a and exit vibrations 76b thereof. At similar points, however, curve 76 is two to three times greater than like points on curve 78.

As a result of the invention, more repeatable hole features are formed in the workpiece 10. While round holes and circular electrodes are shown in the illustrated embodiment, the invention is equally applicable to guiding electrodes configured to produce other geometry holes resembling the geometry of the electrode.

Although the disclosure describes and illustrates a preferred embodiment of the invention, it is to be understood that the invention is not limited to such embodiment. Many variations and modifications will be apparent to those skilled in the art. For a definition of the invention, reference is made to the appended claims:

What is claimed is:

1. In an EDM apparatus having servo drive means for providing a spark gap between the tip of a movable electrode and a workpiece and means for directing dielectric fluid across the gap to remove erosion products from the spark gap the improvement comprising:

an electrode wire having an outer surface and a wire tip thereon which is locatable with respect to a workpiece for forming the spark gap;

movable carriage means for supporting said wire electrode during movement of said wire electrode with respect to the workpiece;

a length of said electrode wire extending outwardly of said carriage means in the direction of movement of said carriage means;

servo-drive means for driving said carriage means and said wire electrode with respect to the workpiece during a machining cycle;

wire guide means for contacting said outer surface of said electrode so as to guide the tip of the electrode with respect to the workpiece as it is driven into spark gap relationship therewith; and means for reducing sliding friction between said wire guide means and said outer surface of said electrode to reduce the amplitude of the operational vibration modes of said electrode tip with respect to said wire guide means during the machining operation.

2. In the EDM apparatus of claim 1, said wire guide means including a base material and having an outer surface coating thereon with a coefficient of sliding friction with respect to the material of the guided wire electrode which is less than that of the coefficient of friction of the base material with respect to the material of the guided wire electrode.

3. In the EDM apparatus of claim 1, said wire guide means including first and second inserts having surfaces thereon defining an opening for passage of the electrode tip therethrough and for guiding the electrode tip by engaging a segment of the wire electrode immediately inboard of the electrode tip; and means coating said insert surfaces for reducing the coefficient of sliding friction of said wire electrode and said insert surfaces.

4. In the EDM apparatus of claim 1, coating means for coating said wire guide means with a layer of plastic material of low coefficient friction material to smooth the servo-drive of said wire electrode.

5. In the EDM apparatus of claim 4, said coating means including a layer of polytetrafluoroethylene.

6. In the EDM apparatus of claim 2, said outer surface coating including a layer of plastic material of a coefficient of sliding friction with respect to the material of said wire electrode for smoothing the servo-drive of said wire electrode.

7. In the EDM apparatus of claim 6, said layer of plastic material being a fluoroplastic material.

8. In the EDM apparatus of claim 7, said fluoroplastic material being polytetrafluoroethylene.

* * * * *